Sept. 21, 1971  YOSHIKAZU SANDO ET AL  3,606,772
APPARATUS FOR TREATING CLOTH
Original Filed May 16, 1967  5 Sheets-Sheet 1

INVENTORS
YOSHIKAZU SANDO
HIROSHI ISHIDOSHIRO
BY
ATTORNEYS

FIG.4
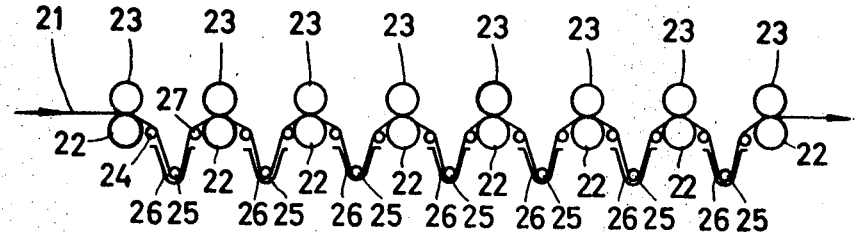
FIG.5       FIG.6
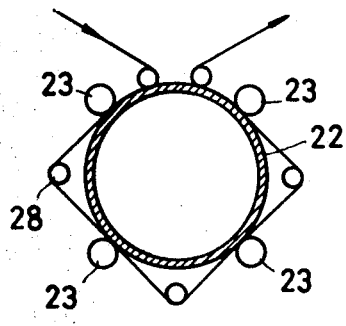    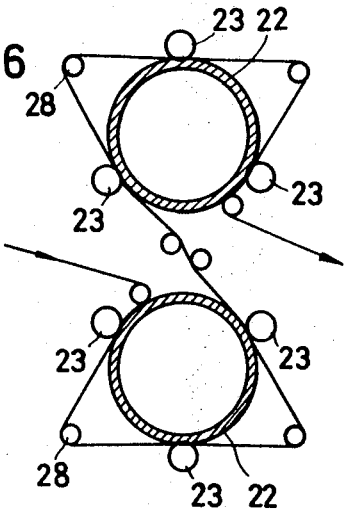
FIG.7
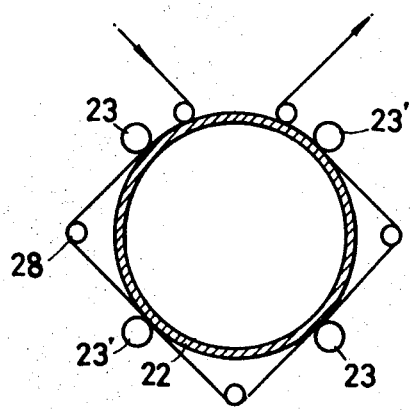
INVENTORS
YOSHIKAZU SANDO
HIROSHI ISHIDOSHIRO
BY Mason and Torew
ATTORNEYS Sept. 21, 1971  YOSHIKAZU SANDO ET AL  3,606,772
APPARATUS FOR TREATING CLOTH
Original Filed May 16, 1967  5 Sheets-Sheet 3

INVENTORS
YOSHIKAZU SANDO
HIROSHI ISHIDOSHIRO
BY
ATTORNEYS

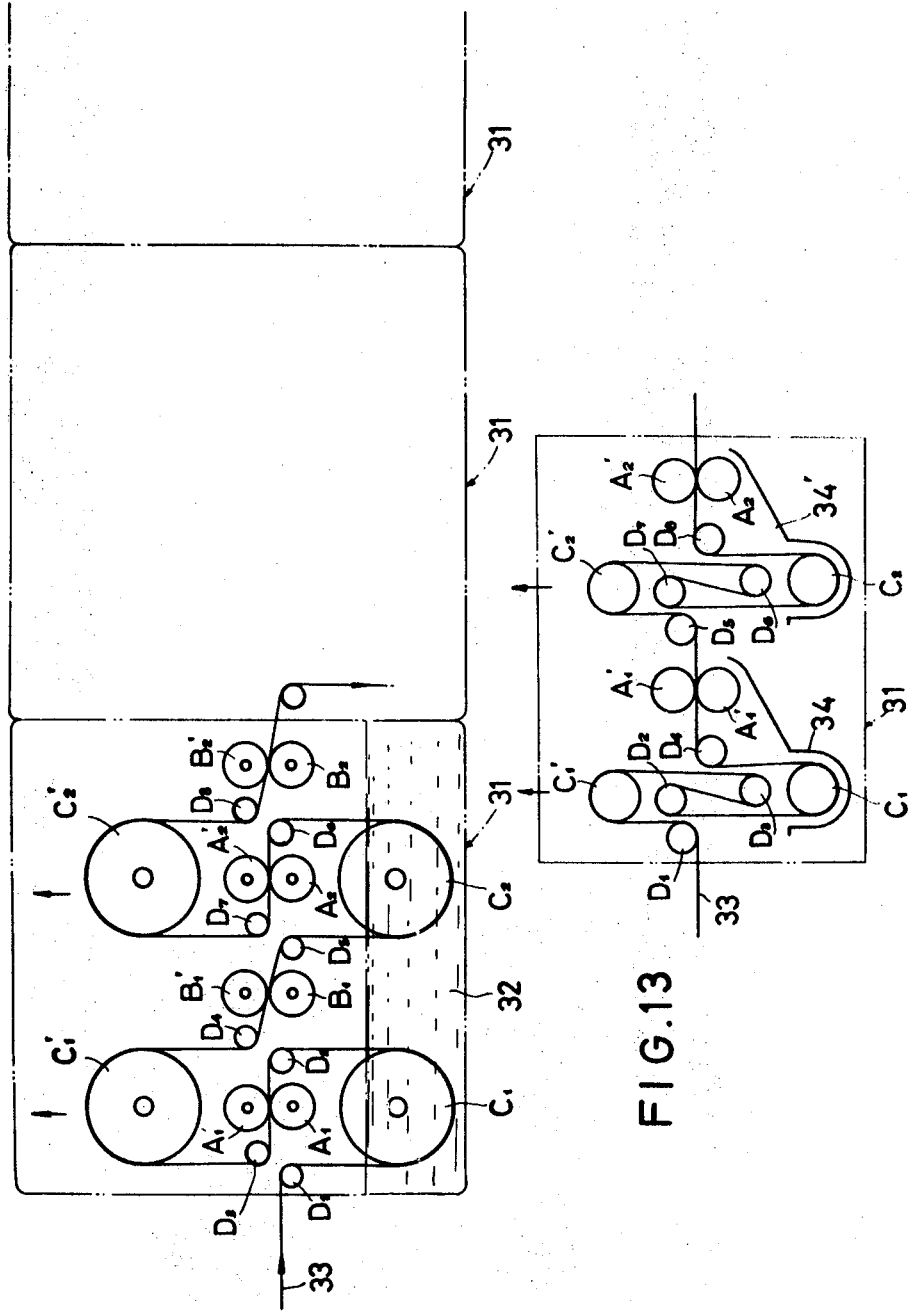

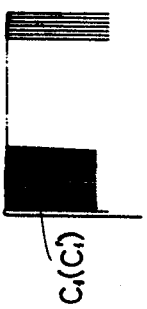
FIG.14a
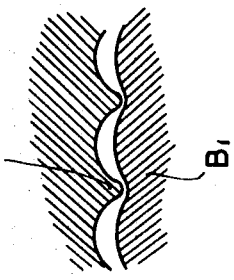
FIG.14b
FIG.14c
FIG.15
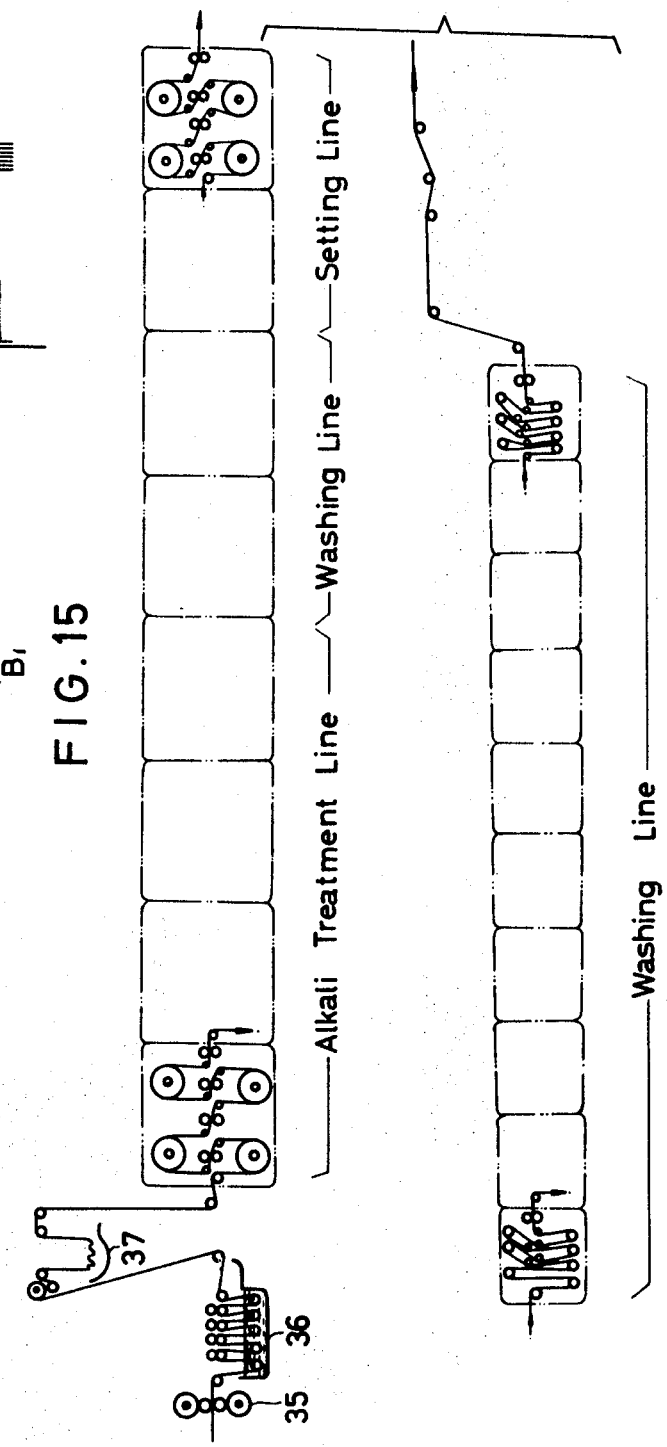

United States Patent Office 3,606,772
Patented Sept. 21, 1971

3,606,772
APPARATUS FOR TREATING CLOTH
Yoshikazu Sando and Hiroshi Ishidoshiro, Wakayama-ken, Japan, assignors to Sando Iron Works Co., Ltd., Wakayama-ken, Japan
Original application May 16, 1967, Ser. No. 638,971. Divided and this application Dec. 11, 1968, Ser. No. 782,890
Int. Cl. D06f 15/00
U.S. Cl. 68—9
2 Claims

ABSTRACT OF THE DISCLOSURE

Apparatus for treating cloth is comprised of a pair of rollers, with at least one of the rollers having grooves formed in its circumferential periphery. The grooves may extend in parallel relationship with or transversely to the axis of the roller. Preferably, the grooved roller is formed of a hard substance and the other roller of a relatively softer substance whereby when the cloth is passed between the two, the grooves in the grooved roller exert a lateral tensioning effect on the cloth. Further, the rollers may be arranged in combination with solution tanks for passing the cloth through the tanks and concurrently laterally and longitudinally tensioning the cloth.

---

This is a division of application Ser. No. 638,971 filed May 16, 1967.

SUMMARY OF THE INVENTION

The present invention relates to apparatus for treating cloth, more particularly, it relates to apparatus for treating cloth which effects a squeezing treatment during a washing operation by passing cloth between a pair of rollers having grooves in at least the surface of one of the rollers which is in contact with the other roller.

Further, the present invention related to a wet system tentering apparatus, and, more particularly, to a roller type wet system tentering apparatus utilizing a combination of grooved rollers which is advantageously applicable to mercerization treatment of cloth.

In conventional squeezing treatment of cloth in a washing operation, the circumferential surfaces of the squeezing rollers used are smooth, and the object of the treatment is to squeeze out a cloth transported from a washing tank and to increase the degree of water absorption of the cloth in the next washing tank. However, in such a treatment, the higher the speed of travel of the cloth, the greater will be the number of washing tanks and squeezing rollers required, and, in addition, a larger quantity of water will be required.

In order to improve the above-mentioned washing effect, in the past various means have been adopted, for example, washing the cloth by vibration, washing by employing water-jets and the like, but these methods have limited effectiveness, and their defects could not be compensated by employing a squeezing roller, except for the purpose of squeezing cloth.

The present invention avoids the aforementioned defects of the conventional apparatus. It is contemplated that a pair of rollers having grooved surfaces in engagement with each other be employed in order to make it possible to wash by rubbing (washing with water) as well as squeezing, to avoid width shrinkage of the cloth or, if required, to widen the cloth and determine the width thereof.

A pair of rollers, as used in the present invention, is provided with a number of grooves on the peripheral surfaces of the rollers extending in the circumferential direction. These grooves may be slanted to a plane perpendicular to the roller axis or they may be in a series of helical type grooves. The rollers may be endlessly engaged with each other, that is to say, the grooves of one of the rollers may be engaged with projections on the surface of the other roller to make continuous contact during rotation.

Thus, according to the present invention, when the cloth is transported between and in contact with these rollers, it is subjected to a wash by rubbing in a longitudinal direction owing to the peripheral velocity difference between the outer surface and the grooved surface of the rollers, and it is also subjected to a wash by rubbing in the lateral direction owing to the expansion and contraction of the width of the cloth caused by its passages between the lands and grooves of the rollers. Thus according to the present invention, a wash by rubbing and squeezing can be performed at the same time, which could not be accomplished with conventional squeezing rollers, and the washing effect on the cloth is improved considerably.

Further, according to the present invention, the cloth is forced into engagement with two rollers, and this provides certain advantages such as the prevention of width shrinkage of the cloth, the prevention of wrinkling thereof and so forth, and it is also effective in case the cloth is treated with various kinds of agents such as alkali, acid and the like.

In addition, in the practice of the present invention, as the cloth is washed by rubbing, such as in washing with water, the washing effect can be increased by employing water jet means before and after the main rollers, so that a large washing tank may become unnecessary and the amount of water employed may be considerably decreased, thus obtaining a considerate advantage.

Further, when the grooves of the above-mentioned pair of rollers endlessly engaged with each other are helically formed left and right and extend progressively from the middle of the rollers' surfaces towards the edge of the cloth, the effects such as prevention of shrinkage as well as the width expansion of the cloth may be obtained.

For example, the cloth is enlarged to a certain width by an appropriate combination of the above-mentioned grooved rollers to prevent and regulate any shrinkage in the width of the cloth, and therefore it is possible to carry out a chainless mercerizing treatment.

Apparatus for a chainless mercerizing treatment utilizing rollers has hitherto been available, but though such apparatus can impose a sufficient tension on the cloth in a longitudinal direction, it is impossible to prevent shrinkage in the width of the cloth by imposing a lateral tension thereon, because the rollers have smooth peripheral surfaces. Accordingly, uniformity of whiteness and lustre of the product has never been achieved by conventional means. However, by utilizing the present invention, good mercerization becomes possible, and conventional machines for treating cloth may be remarkably simplified, thus providing appreciable advantages.

Meanwhile, cloth is woven with its threads maintained to certain degrees in a strained state, but the degrees of strain is not uniform for all threads. For this reason the cloth does not display its full strength. That is to say, when a uniform tension is imposed on a cloth, having a certain length and width, in both lateral and longitudinal directions, the threads will break in a non-uniform manner, and eventually the cloth is divided. Now, when a uniform tension is imposed on a cloth in its woven state and the tension is increased to a point just short of the tension at which just the threads will break, the strength of said cloth increases in a range of 30–50%. That is to say, all of the threads in every portion of the cloth is given a maximum tensile strength and therefore the cloth is not easily broken or torn as compared with conventional cloth.

Further, in the past it has been thought that the less tension imposed on a cloth, the stronger the cloth will be. However, in such a case, some threads of the cloth are strained and others are loosened, which will cause wrinkles and the like. Therefore, in order to avoid such defects, the cloth has hitherto been subjected to a treatment with resins, mercerization treatment, or setter treatment and the like.

On the contrary, according to the present invention, the object thereof can be easily achieved by employing a combination of rollers, and further, the present invention is contemplated in such a manner that the strength of a cloth may be increased by employing a combination of rollers to expand the cloth and to set (wet setting) the cloth at its largest width, instead of widening the cloth by employing a tenter and carrying out a setting.

The arrangement of the grooves on the solid roller is not particularly specified, buit is described for the grooves to be positioned at close intervals.

In addition, the grooves may be arranged as longitudinal grooves extending in the circumferential direction of the roller, as oblique grooves at a certain angle to the circumferential direction of the roller, or as lateral grooves provided in the direction of the axis of the roller, but it is desirable to combine these different kinds of grooves in accordance with the object for use.

In conventional mercerizing apparatus, a clip tenter has generally been used to carry out the tentering of a cloth to be treated. But in practice, tentering of only about several centimeters at the loops of the cloth is effected, and in order to tenter the middle part of the cloth, the tentering treatment must be repeated about two or three times.

In addition, since the clip tenter is of a chain type, the transportation speed of the cloth cannot be sufficiently accelerated, and it has been limited to a speed of about 100 to 150 m./min.

Further, in conventional mercerizing apparatus, a cloth is padded with an alkali solution by employing a first padder, the cloth thus treated is hung upon a tension cylinder used for tensioning and elongating the cloth in the longitudinal direction and next the cloth is immersed again in an alkali solution by employing a second padder, and afterwards a lateral tension is imposed by a tenter. Thus, in this case, the cloth is given a frictional resistance by a chain guide rail of the tenter and it is impossible to give too strong a lateral tension to the cloth. If tentering is forcibly carried out, a breakdown of the loops may occur.

The present invention is contemplated to avoid these defects. That is, the apparatus of the present invention is a combination of a group of longitudinal tensioning rollers consisting of a pair of rollers grooved on the surface thereof for maintaining a constant lateral tension on the cloth suspended between the two rollers by regulating the distance between the rollers, and a group of lateral tensioning rollers consisting of a pair of rollers, having grooves engaged with each other endlessly in their peripheral direction, or of a soft roller having a flat or smooth surface and a hard roller having grooves in its surface extending in the circumferential direction, so that a cloth is squeezed between the surfaces of both rollers as it is passed between them. Thus the desired object of the present invention may be achieved.

That is to say, according to the apparatus of the present invention, longitudinal tension is given by the longitudinal tensioning rollers and lateral tension by the lateral tensioning rollers, so that both longitudinal and lateral tension may be applied at the same time. Therefore, an elongation of a cloth may be carried out in both the longitudinal and lateral directions concurrently in the course of changing the cloth into an alkali cellulose in a mercerization treatment of the cloth, which is an advantageous point of the present invention, and the mercerization effect may also be improved.

The present invention will be explained more fully in the accompanying drawings and descriptive matter in which there are illustrated and described preferred embodiments of the invention. The various features of novelty which characterize the invention are pointed out with particularity in the claims annexed to and forming a part of this specification.

BRIEF DESCRIPTION OF THE DRAWINGS

In the drawings:

FIG. 1 is a front view of a pair of grooved rollers having square grooves, FIG. 2 is a front view of another arrangement of the grooved rollers for expanding the width of cloth, and FIG. 3 is a side view of these rollers.

FIG. 4 to FIG. 7 inclusive illustrate apparatus employed in embodiments of the present invention.

FIGS. 12–15 show examples of a wet system tentering apparatus according to the present invention.

DETAILED DESCRIPTION OF THE PREFERRED EMBODIMENTS

Figure 1:
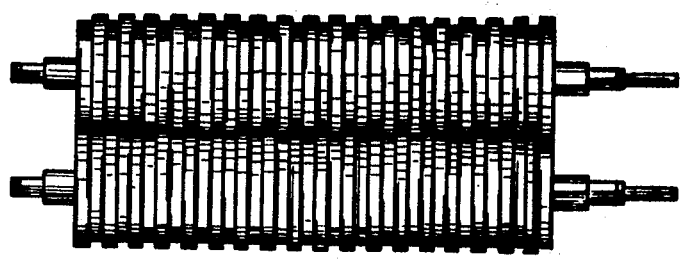
FIGS. 1–3 show an apparatus used in the practice of the processing and treating cloth according to the present invention.

FIG. 1 is a front view of a pair of grooved rollers having square grooves. The groves extend circumferentially about the roller in planes disposed perpendicularly to the axis of the roller. These rollers are made of rubber having an appropriate hardness. But, in accordance with the qualities of the cloth to be treated, one of the rollers may be covered with ebonite or made of stainless steel. Further, appropriate clearances are given to the width of the grooves on consideration of the thickness of the cloth to be treated. Each of the grooved rollers is provided with alternating grooves and lands, with the lands of each roller being positioned to fit within the grooves of the juxtaposed roller.

Further, with regard to the shape of these grooves, other configurations may be used, such as circular grooves, ladder shaped grooves and so forth, in accordance with the quality of the cloth being treated. In addition, the rollers combining various shapes of grooves may be used, in order to prevent the cloth from being damaged, for example, in case of square grooves, the edge portions may be slightly rounded.

Figure 2:
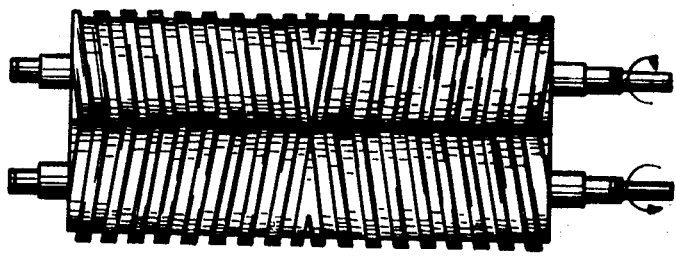

In FIG. 2 a front view is shown of a pair of grooved rollers for expanding the width of cloth. The grooves of the rollers are formed as screwed or helical grooves extending from the longitudinal center of the rollers toward their opposite ends. These rollers are excellent not only for their ability to expand the width of cloth, but also for their ability to squeeze the cloth. These effects are obtained because where the cloth is pushed in the contact surface (nip) of the rollers which is always shifting, and the effects in washing by rubbing, rubbing cloths and the like are remarkably increased.

Figure 3:
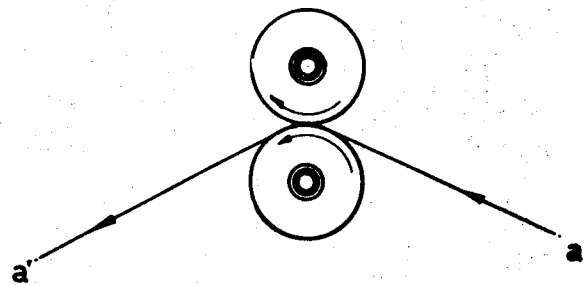

FIG. 3 is a side view of a pair of these rollers for expanding the width of cloth. When the cloth is made to pass from a and a', and the rollers are rotated in the direction shown by the curved arrows, the cloth will be pushed obliquely between the rollers with the aid of projections of the grooved portions of the rollers for expanding the cloth towards both of its sides.

Further, the rotation of these rollers is arranged so that it may be regulated by employing a transmission and the like to widen and regulate the width of the cloth. This can be achieved in the manner as shown in FIGS. 2–3.

That is to say, when the rotation speed of the rollers is slightly slowed down in transportation of the cloth, as shown in FIGS. 2-3, so that the peripheral velocity of the rollers will become slower than that of the transportation of the cloth, the cloth begins to be forcibly widened. On the contrary, when the rotation of the rollers is speeded up to increase the peripheral velocity of the rollers, the width of cloth may be reduced. Thus, the operation of widening of cloth to a certain dimension may be carried out by the micro-regulation of the rotation speed of the rollers which is effected automatically or by hand.

As mentioned above, the effects of the present invention are remarkable, for example, the increase of the treating ability, the simplification of the apparatus, the decrease in the installation area required for the apparatus, and the cost reduction owing to the decrease in the amount of liquid agent used and so forth.

Next, the arrangement for treating cloth and increasing its strength will be explained referring to FIGS. 4-11.

Figure 8:
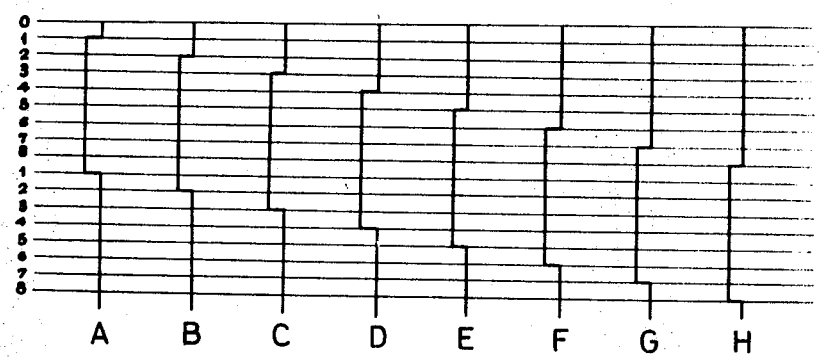
FIG. 8 shows the condition of the shifting of grooves on the rollers in FIG. 4 to FIG. 6 inclusive.

As shown in FIG. 4, cloth 21 is forwarded with the aid of a soft roller 22 made of rubber in a mangle A, see FIG. 8, having a sufficiently large diameter and a smooth surface (Shore hardness: $55°\pm2°$) and a grooved roller 23 made of hard rubber (Shore hardness: $98°+2°$), while forming an irregular surface in the cloth between the surfaces of the rollers 22 and 23 in pressure contact with each other, then the irregular surfaces are made flat by a curved expander roller 24, and the cloth is subjected to another expander 27 after passing over roller 25 located in a liquid tank 26 (containing water or other agents) and then proceeds towards a combination of grooved rollers forming a mangle B consisting of a soft roller 22 and a grooved hard roller 23 in pressure contact with each other. In this way, the cloth is passed continuously through mangles C, D to H.

In the above case, as shown in FIG. 8, the grooves of the rollers change their phases in the order of mangles A, B, C to H, shifting the phases gradually so that any irregularity may be dispersed into uniform intervals from the mangle A to the mangle H.

In the above case, the grooves of the hard rollers cut into the soft roller in a sufficient degree to increase the strength of the cloth. This is illustrated in reference to FIGS. 10 and 11, wherein a cloth on the roller 22 made of soft rubber is, in the first place held down on the hard roller 23 at certain intervals by the grooved parts $a$ of the hard rubber rollers, and then the grooved parts $a$ cut into the surfaces of the soft rubber rollers 22, so that the portion of the cloth, which is not held down by the grooves, may be projected, and the cloth may be elongated by a length of the projected part, that is, an arc portion. In this manner, the cloth is elongated in its lateral direction, and in the longitudinal direction of said cloth, a tension may be imposed in a simple fashion by giving a speed differential to the tension rollers between each of the mangles. A conventional tenter is contemplated in such a manner that a cloth may be elongated in its lateral direction by catching merely the loops of cloth, but the cloth thus treated is elongated only by several centimeters at its loops.

When a tenter is employed in a mercerization process and the like, the portions of about 4-10 cm. from the loops of the cloth are tensioned, and on examining each sections (lateral directions) of the cloth, the middle portions thereof have not been tensioned at all. On the contrary, according to the present invention, each of the sections of the cloth is uniformly tensioned, so that the present invention may also function effectively in a mercerization treatment of a cloth.

Further, FIGS. 5 and 6 are practical modes of employing an apparatus according to the present invention, wherein a soft rubber roller 22 having a smooth surface and a sufficiently large diameter is set at the central part of the combination of rollers, and several hand grooved rollers 23 are positioned in spaced locations about the circumference of the roller 22. In order to give irregular surfaces to the cloth by a spraying agent or water and the like is deposited on the cloth immediately before the cloth passes over the grooved rollers. The cloth also passes over expander rollers 28.

Figure 9A:
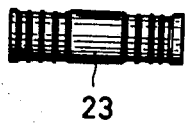
FIGS. 9(a) and (b) show the variations of the grooves on the rollers in FIG. 4.
Figure 9B:
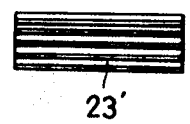
Figure 11:
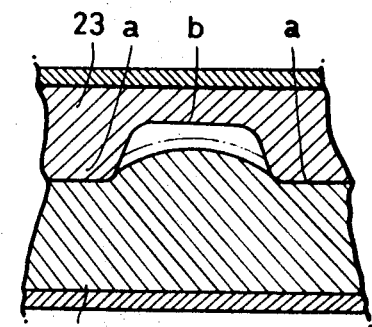
FIG. 10 and FIG. 11 are enlarged partial illustrations, showing the appearance of a grooved surface roller and a flat surface roller under pressure.
Figure 10:
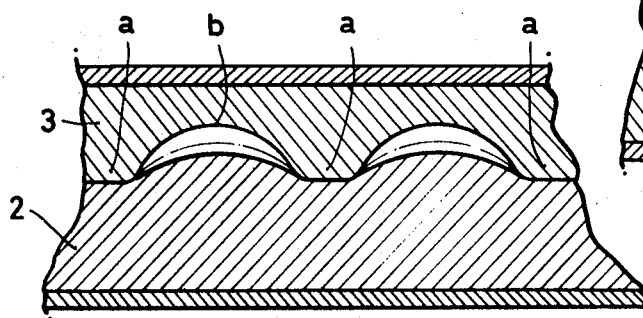

In addition, FIG. 7 shows a practical mode of the present invention similar to FIGS. 5 and 6, except that, as shown in FIGS. 9a and 9b, a roller 23 provided with grooves in its circumferential direction and a roller 23' provided with grooves in its longitudinal direction are combined for use and arranged in order to impose tension alternately in the longitudinal and lateral directions of the cloth.

The apparatus of the present invention can be applied to various treatments of cloth. For example, it may be effectively employed for tentering cloth by washing with water or in a continuous treatment with resins, and in place of a tenter in a continuous dyeing machine. Further, when the apparatus of the present invention is employed instead of a tenter in a mercerization apparatus, satisfactory results can be obtained.

The following are examples of the use of the wet system tentering apparatus of the present invention as applied to a mercerization apparatus. But it should be noted that the apparatus of the present invention may be applied to all of the wet tentering processes carried out in a washing apparatus in a mercerization treatment.

EXAMPLE 1

In FIG. 12, which is illustrative of one example of apparatus embodying the present invention, the sections 31, 31 are independent unit apparatuses. Each of the unit apparatuses 31 is constructed in such a manner that the hereinafter mentioned longitudinal tension rollers and lateral tension rollers are accommodated within a substantially closed alkali solution tank.

$C_1$, $C_1'$ and $C_2$, $C_2'$ are longitudinal tension rollers forming lower and upper counter parts, the tension rollers having narrow grooves disposed in the peripheral direction on the surfaces of the rollers. In addition, the greater portion of each of the lower rollers $C_1$, $C_2$ is located below the level of the alkali solution 32 in the apparatus 31.

These longitudinal tension rollers are constructed in such a manner that a cloth suspended over the rollers such as $C_1$, $D_1$ and the like may be given a tension in a determined direction by pushing up the upper roller $C_1'$ in the direction indicated by the arrow. (Further, it is also possible to achieve the same result by pushing down on the lower rollers $C_1$ and $C_2$.)

$A_1$, $A_1'$ and $A_2$ and $A_2'$ are respectively lateral tension rollers forming lower and upper counter parts of the other, and they are placed between $C_1$ and $C_1'$ or between $C_2$ and $C_2'$ respectively, and are in pressure contact with each other. The rollers of each pair are in engagement with one another by means of their grooves and projections provided in peripheral direction of the rollers.

$B_1$, $B_1'$ and $B_2$, $B_2'$ are respectively pairs of lower and upper rollers pressed against each other, these pairs of rollers being arranged alternately with the pairs of rollers $A_1$, $A_1'$ and $A_2$, $A_2'$. These are also lateral tension rollers and are in pressure contact with each other. That is to say, the lower rollers $B_1$, $B_2$ are soft rollers having smooth surfaces and the upper rollers $B_1'$, $B_2'$ are hard rollers having grooves in the peripheral direction. $D_1$–$D_8$ are guide rollers.

The action of the above-mentioned unit mercerization apparatus is explained as follows:

A cloth to be treated enters into the apparatus section 31 and passes into a tank of alkali solution 32 traveling over a guide roller $D_1$ and is suspended over the roller $C_1$, and then comes out of the alkali solution and passes over guide roller $D_2$ and then between the rollers $A_1$ and $A_1'$, and at last is suspended over the roller $C_1'$ after moving over the guide roller $D_3$.

In this case, the cloth is given a longitudinal tension by the rollers $C_1$, $C_1'$ and at the same time it is given a lateral tension by the rollers $A_1$ and $A_1'$, while these rollers $A_1$ and $A_1'$ function also as squeezing rollers.

As mentioned above, the cloth passing over the roller $C_1'$ is again given a lateral tension while it passes between the rollers $B_1$ and $B_1'$ after traveling over the guide roller $D_4$, and as mentioned above, the cloth is given a longitudinal tension and a lateral tension by the longitudinal tension rollers $A_2$, $A_2'$ and lateral tension rollers $B_2$, $B_2'$, respectively, and is subjected to a mercerization treatment. In addition, the rollers $A_1$, $B_1$, $A_2$ and $B_2$ function as driving rollers.

Further, the grooves provided on the surfaces of the roller belonging to the above-mentioned groups A, B, and C may be rectangular, arc-like or otherwise, but it is desirable that the grooves, provided in the circumferential direction, slant at an acute angle to the circumferential direction and be arranged at intervals as close as possible to one another.

EXAMPLE 2

In FIG. 13, which shows another embodiment of the present invention, a unit apparatus 31 contains hereinafter-mentioned longitudinal and lateral tension rollers and separate tanks 34, 34' containing an alkali solution. The tanks 34, 34' contain an alkali solution, in which the rollers $C_1$ and $C_2$ are immersed.

In addition, each pair of rollers $C_1$ and $C_1'$, and $C_2$ and $C_2'$ constitutes respectively longitudinal tension rollers, and each of the pairs of rollers $A_1$ and $A_1'$, and $A_2$ and $A_2'$ constitutes lateral tension rollers. Arranged in spaced positions in the apparatus 31 are guide rollers $D_1$–$D_8$, but rollers $D_2$, and $D_6$ and $D_7$ are dancer rollers. In this embodiment of the present invention, the group of upper and lower rollers C is fixed in place, and longitudinal tension of the cloth is regulated with the dancer rollers.

EXAMPLE 3

In FIG. 15, an example of a high speed continuous mercerizing apparatus is shown constructed by arranging four tanks of the unit apparatus 31, shown in FIG. 12, as a group of alkali treatment apparatus, next two tanks of the same apparatus are used as water washing means, then two tanks are employed as a group of setter apparatuses, and finally ten tanks are used as water washing apparatuses, for a total of eighteen tanks.

Further, positioned in advance of the tanks is a high pressure mangle 35, a saturator 36 and a piler 37.

The effects of the present apparatus may be summarized and enumerated as follows; namely, (1) Though only up to 150 m./min. of treating speed could be obtained in tentering according to the usual tentering apparatus, because the apparatus was driven by chains, however the process embodied in the apparatus of the present invention is not influenced by the speed of the cloth, because it is a roller type apparatus.

(2) According to the usual tentering methods, fissures in a cloth often occur if the opening degree of tentering is made to increase when the cloth enters a tenter machine at high speed, and the length of the tenter machine also must be long. Therefore, the installation area of the tentering machine must be increased. On the contrary, in accordance with the present invention, the required area for the apparatus comparatively is considerably less.

(3) According to the usual clip tenters, only the loops of cloth are easily elongated, the tentering of the cloth cannot be effected uniformly in every portion of said cloth, and therefore the touch at the center of the cloth is different from that of the loops.

On the contrary, according to the present invention, it is possible to effect a tentering with an equivalent strength in both the longitudinal and lateral directions, and therefore the touch of the cloth is uniform in every portion of the cloth.

(4) In a mercerization treatment according to the usual tentering method, it is necessary to provide an alkali solution shower on the tenter, and a suction beneath the tenter. However, in the present invention, shower, suction and the like are not necessary, but it is only required to arrange the rollers in a tank containing an alkali solution.

(5) According to the conventional apparatus, elongations of the cloth in both the longitudinal and lateral directions have been combined in series. But in the present invention, the longitudinal elongations and lateral ones of the cloth may be done simultaneously simply by accommodating a group of rollers in a single box.

(6) According to the conventional tentering methods, it is necessary to change the width of tenter every time the width of cloth to be treated changes. But the present invention may be carried out regardless of the width of the cloth.

(7) According to the present invention, a simultaneous tentering of a two ply cloth may be performed, but this cannot be carried out in accordance with the usual tentering method.

What is claimed is:

1. An apparatus for processing and treating cloth comprises a roller having grooves formed in the circumferential periphery thereof, means juxtaposed to and in surface contact with said grooved roller, means for passing cloth between said roller and said means in surface contact therewith, said means in contact with said grooved roller comprises a second roller disposed in opposed and parallel relationship with said grooved roller for receiving the cloth therebetween and for urging said cloth into the grooves formed in said grooved roller, a tank containing a washing solution is positioned adjacent a pair of said grooved and second rollers, a longitudinally tensioning roller is positioned within said tank, and dancer rollers are disposed in combination with said longitudinal tensioning roller for exerting tension on a cloth as it passes over the longitudinal tensioning roller within said tank, and a guide roller is disposed between said tank and said pair of grooved and second rollers for directing the path of travel of the cloth therebetween.

2. An apparatus for processing and treating cloth, as set forth in claim 1, comprising a multiple number of the apparatus set forth in claim 1, serially arranged for the continuous passage therethrough of a cloth to be processed, a high pressure mangle disposed before said multiple arrangement in the direction of travel of the cloth, a saturator and a piler disposed between said mangle and said multiple arrangement of apparatus.

References Cited

UNITED STATES PATENTS

| | | | |
|---|---|---|---|
| 88,418 | 3/1869 | Schlingman | 68—22 |
| 978,883 | 12/1910 | Heberlein | 68—9 |
| 1,008,426 | 11/1911 | Milson | 68—22X |
| 1,351,621 | 8/1920 | Clarenbach | 68—22 |
| 1,807,762 | 6/1931 | Thies | 68—22X |
| 2,176,835 | 10/1939 | Cumfer | 29—121X |
| 2,191,296 | 2/1940 | Kleine et al. | 68—22 |
| 2,729,537 | 1/1956 | Lasley | 68—22X |
| 3,454,970 | 7/1969 | Sutherland | 68—99 |

FOREIGN PATENTS

| | | | |
|---|---|---|---|
| 231,934 | 2/1964 | Austria | 68—22 |
| 616,231 | 7/1935 | Germany | 68—99 |
| 13,821 | 1886 | Great Britain | 68—99 |

WILLIAM I. PRICE, Primary Examiner

U.S. Cl. X.R.

68—22, 177